United States Patent
Brooks

[11] 3,769,658
[45] Nov. 6, 1973

[54] FEEDING MEANS FOR ROLLER GINS
[75] Inventor: Eugene H. Brooks, Sherman, Tex.
[73] Assignee: Hardwicke-Etter Company, Sherman, Tex.
[22] Filed: Sept. 27, 1971
[21] Appl. No.: 184,069

[52] U.S. Cl.................. 19/64.5, 19/105, 19/204, 100/176
[51] Int. Cl............................................ D01b 1/06
[58] Field of Search................ 19/240, 105, 50–54, 19/48, 49, 64.5, 97.5, 204, 205, 203, 161; 100/161, 176, 119, 120; 28/1.6; 53/93, 95, 96

[56] References Cited
UNITED STATES PATENTS
| | | | |
|---|---|---|---|
| 2,500,690 | 3/1950 | Lannan | 19/161 R X |
| 2,368,637 | 2/1945 | Bruenner | 28/1.6 |
| 646,954 | 4/1900 | Chauncey | 19/52 |
| 3,562,866 | 2/1971 | Roberson et al. | 19/240 |

FOREIGN PATENTS OR APPLICATIONS
1,114,672  12/1955  France................. 19/204

Primary Examiner—Dorsey Newton
Attorney—Bertram H. Mann

[57] ABSTRACT

In order to increase the capacity and durability of a roller gin, the seed cotton customarily supplied intermittently to the ginning region is delivered to this region by an auxiliary feeder device including successive pairs of rollers forming a pathway leading from the inlet to the ginning region. Successive pairs of rollers are caused to rotate at progressively reduced peripheral speeds so that the cotton is condensed and delivered to the roller in a substantially continuous and uniform mat. This results in the drawing of a continuous, uniform mat of fibers between the stationary blade and the roller which, in turn, permits increasing of the pressure of the blade against the roller with resultant increase in capacity without undue heating of the roller.

6 Claims, 1 Drawing Figure

PATENTED NOV 6 1973
3,769,658
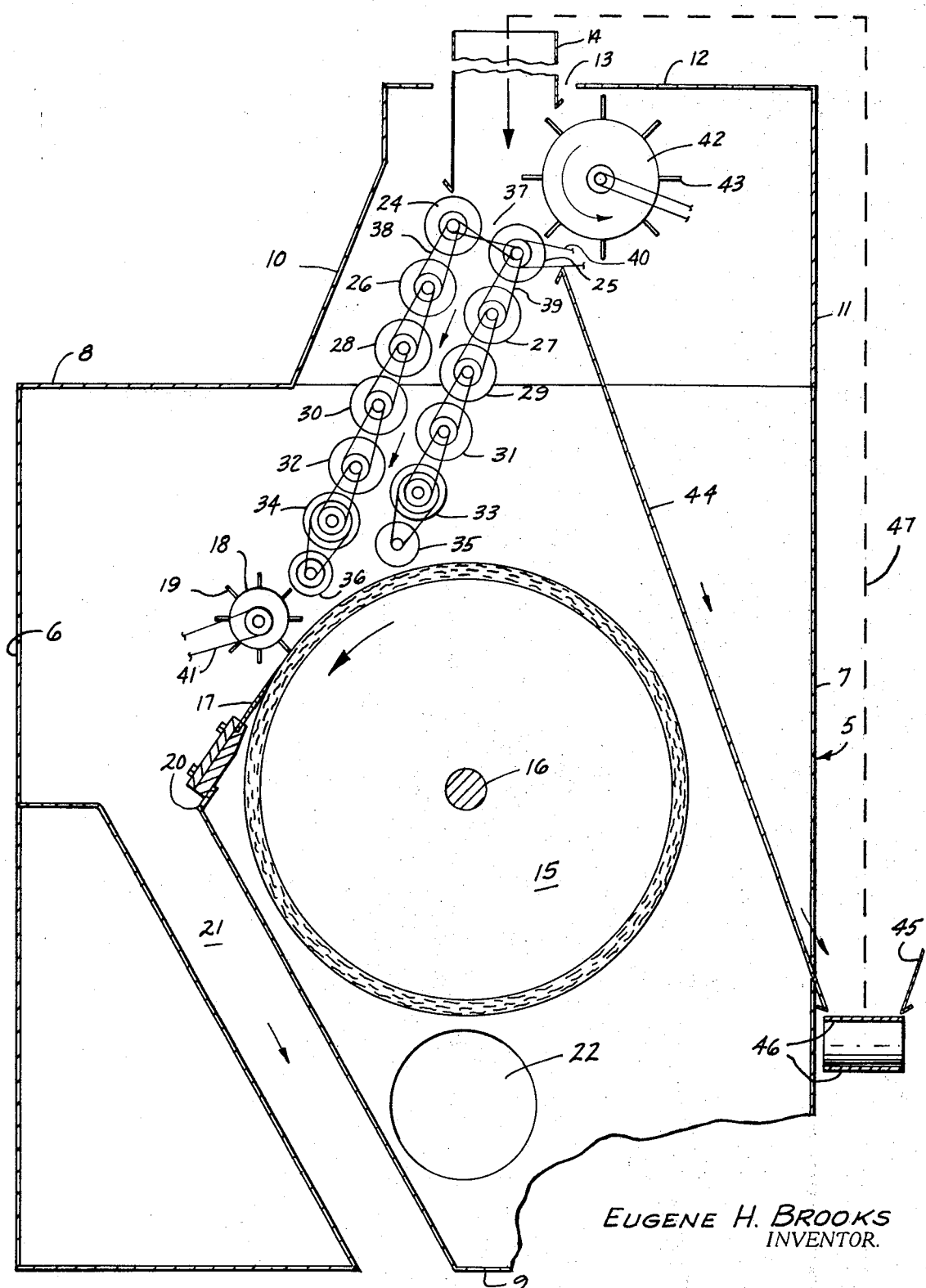
EUGENE H. BROOKS
INVENTOR.
BY Bertram H. Mann
ATTORNEY

FEEDING MEANS FOR ROLLER GINS

SUMMARY OF THE INVENTION

This invention relates to feeding devices for matted fibers and, for instance, for roller gins used in separating cotton fibers from adhering cotton seeds.

Such roller gins conventionally utilize a revolving ginning roller covered with a special fibrous-rubber covering against which the stationary or doctor knife bears tangentially. The seed cotton locks delivered to the roller adhere to the surface of the roller and are dragged thereby against the knife which tends to tear the seeds from the lint and deliver the separated seeds and lint to separate collecting areas. A roller gin of this general type is disclosed and claimed in Brooks U.S. Pat. No. 3,245,123.

A "feeder" is usually installed above and ahead of the roller gin stand to regulate the rate of flow of seed cotton to the gin and, in some instances, to perform cleaning operations. Some such feeders are designed to remove only small trash particles, dirt, and the like, while others are designed to remove sticks, hulls, and other extraneous matter before the seed cotton reaches the gin stand. The seed cotton is discharged from the feeder onto a slide which directs the cotton by gravity to the ginning roller ahead or upstream of the stationary ginning knife. Other installations not utilizing a slide, direct the cotton as close as feasible to the ginning region just ahead of the knife.

In all of the aforementioned feeding arrangements gravity primarily is relied upon to deliver the seed cotton to the surface of the ginning roller and subsequently to the ginning knife. However, the seed cotton, customarily leaves the feeder in a somewhat irregular fashion. While the desired rate of flow of seed cotton through the feeder can be controlled by regulating the speed of the feeding mechanism near the entrance to the feeder, there usually is a general lack of uniformity in the flow of seed cotton when the cotton leaves the feeder and the flow is not sufficiently condensed to provide the desired maximum roll coverage and corresponding maximum capacity and efficiency in the ginning process.

In roller gin practice, it is well known that since great pressure must be maintained between the ginning knife and the surface of the ginning roller, whenever the gin is operated with little or no seed cotton being fed to the roller, frictional heat is quickly built up so that if the pressure is not promptly relieved, the roll may be damaged. On the other hand, it is obvious that a more uniform coverage of the roller with lint cotton results in less idle or nonworking areas as well as reducing the frictional heat due to contact of the blade with the roller.

Accordingly, an object of the present invention is to provide feeder means for matted fibers, such as seed cotton, which will convert intermittently supplied material to a substantially more continuous and uniform mat.

A more detailed object is to provide in a roller gin a feeder device which tends to condense the intermittently delivered supply of seed cotton so that a substantially continuous and uniform mat is delivered to the ginning region where the lint and seeds are separated.

In accordance with the present invention, there are provided between the feeder discharge point and the ginning region a plurality of pairs of feed rollers spaced apart to form a continuous pathway. The rollers are caused to rotate oppositely so as to direct the seed cotton supply through the pathway to the ginning region, while the rollers of successively pairs rotate at progressively decreasing speeds. Immediately upstream and at the side of the first of the successive pairs there is provided a bladed overflow roller which diverts any excess supply of seed cotton at the entrance to the mentioned pathway. The roller powering means is provided with variable speed controls so that the desired continuous mat of seed cotton will be deposited on the roller under varying conditions of seed cotton supply.

BRIEF DESCRIPTION OF THE DRAWING

The drawing is a schematic representation of a roller gin, which may be, in general, of the type illustrated in the above-mentioned Brooks patent and which incorporates the novel feeder means.

SPECIFIC DESCRIPTION OF THE INVENTION

The gin stand is provided with a protective casing, generally designated 5 having front and rear walls 6 and 7, a top wall 8, and a bottom wall 9. Walls 10, 11 and 12 projecting above top wall 8 form an inlet 13 into which projects a supply chute, shown in part at 14, leading from the usual feeders or other seed cotton supply and treatment equipment. Walls 8 and 10 are not essential and may be omitted.

Main ginning roller 15 is rotatably mounted on a shaft 16 which is suitably powered for counterclockwise rotation. The ginning roller is covered with material to which the cotton fibres will adhere. Stationary knife blade 17 bears tangentially against the surface of roller 15 so as to intercept the cotton seeds driven thereagainst and tear the same from the lint which continues its travel between the roller surface and the knife. A moving blade doffer or seed stripper 18 having blades 19 is rotatably mounted abreast of the edge of the knife to aid in the ginning operation. The stripped seeds pass down a slide 20 and outwardly through a chute 21 for collection. The cotton lint is suitably doffed from roller 15 by means not shown and conducted through suction flue 22 to lint cleaners and other collection equipment.

Rotatively mounted between supply or inlet duct 14 and the ginning region formed by roller 15 and stationary and rotating blades 17 and 19 are a succession of pairs of condensing feed rollers 24 – 33, inclusive, of uniform size, and additional terminal rollers including the pair 34 and 35 and single roller 36. The rollers of each pair are spaced apart to form a path therebetween, for instance, at 37 between the first pair of feed rollers, and all of the resultant paths are aligned and disposed along a downwardly inclined plane forming a pathway connecting the inlet to the ginning region. The last rollers 35 and 36 are positioned close to the surface of roller 15 and upstream of stationary knife 17. The pairs of condensing rollers 24 – 33, inclusive, are rotated as by suitable belting indicated for instance at 38 and 39 with sheave wheels or pulleys of such size and with rollers 24 and 25 so connected as to cause the rollers of each pair to rotate oppositely and with their adjacent surface portions moving in the same direction so as to tend to draw cotton supplied thereto between the rollers and thence deliver the cotton to the ginning region. Moreover, the rollers of successive condensing pairs are caused to rotate at progressively decreasing angular and peripheral speeds so as to tend to retard and thereby condense the supplied seed cotton and to deliver a substantially continuous and uniform mat thereof to the ginning region. Roller 25 is driven by a chain 40 from the source of power. Bladed roller 18 is driven by a belt or chain 41. The final rollers 35 and 36 of the series propel this cotton mat against the surface of the ginning roller. The described powering means for the various rollers is merely suggestive, other powering means being readily devised by those skilled in the art.

While the feed roller powering means will incorporate speed adjustments, an overflow roller 42 with flexible blades 43 is mounted immediately upstream of first roller 25 of the series and at the side of path 37 between rollers 24 and 25. The overflow roller is caused to rotate counterclockwise with the peripheries of its blades moving somewhat slower than the surface of first feed rollers 24 and 25. In case of excess supply of seed cotton to the entrance to path 37 between the first pair of feed rollers, such excess supply will be diverted by blades 43 and delivered to a slide 44 for discharge through a chute or hopper 45 to a belt conveyor 46 whence the overflow seed cotton is returned by suitable means to inlet 14, for instance a suction flue, as symbolized by the dotted line 47.

In an exemplary embodiment of the invention, in which the ginning roller was of 15 inch diameter and operated at 80 RPM, rotary blade member 18 was of 2 ¾ inch diameter and operated at 220 RPM. Small final roller 36 operated at 707 RPM, while adjacent small roller 35 operated at 438.3 RPM. Roller 34 operated at 281.8 RPM. The other rollers, beginning with first pair 24, 25 operated at varying speeds in accordance with the following table:

| Roller No. | RPM | Surface Speed Inches Per Minute |
|---|---|---|
| 24, 25 | 400 | 2513 |
| 26, 27 | 366 | 2300 |
| 28, 29 | 335.5 | 2105 |
| 30, 31 | 307.5 | 1932 |
| 32, 33 | 281.8 | 1770 |

OPERATION

The operation is believed to be obvious from the above description. The speeds of initial feed rollers 24 and 25 and the corresponding progressively decreased speeds of rollers 26 – 34, will be determined in accordance with the rate of supply through feeder duct 14 to insure the delivery to the ginning region of the desired continuous uniform mat of seed cotton and at the desired speed to provide the desired ginning rate. In case of an excess supply through duct 14, which may be desirable in some cases, excess in supply to entrance area 37 is diverted by overflow roller 42 and returned to the ginning inlet. It has been found that with uniform coverage of the surface of roller 15 in the ginning region, it is possible to increase the pressure of stationary knife 17. Moreover, the continuous supply of seed cotton to the ginning region additionally adds to the capacity of the gin, while avoiding overheating of the ginning roller.

While the novel feed device is especially adapted for and advantageous in connection with a roller gin, it may find utility in other situations where it is desirable to change an intermittent supply of aggregated fibers to a substantially continuous and uniform mat. The numbers of successive pairs of rollers and the specific speed relationships thereof may be modified in accordance with requirements as may be the powering means. The condensing series of rollers may constitute a separate unit interposed between the outlet of a conventional feeder and the ginning region, or may be supplied as part of the gin itself.

The invention may be modified in these and other respects as will occur to those skilled in the art and the exclusive use of all modifications as come within the scope of the appended claims is contemplated.

I claim:

1. A feeder device for improving the continuity and uniformity of fiber aggregations supplied irregularly thereto and delivered thereby to a treatment region comprising an inlet, a plurality of pairs of feed rollers disposed successively, the rollers of each pair being spaced apart to form a path for fibers and the paths thus provided forming a pathway between said inlet and said region, means for causing rotation of the rollers of each pair oppositely so as to move approaching fibers therebetween and to cause rotation of at least some of said pairs of rollers at peripheral speeds progressively slower than the preceding pairs so as to condense the delivered fibers into a substantially continuous, uniform mat, and an overflow roller positioned immediately upstream and at the side of the path between the first of said pairs of rollers so as to divert excess supply of fibers away from said pathway.

2. A feeder device as described in claim 1 further including conveyor means for returning the diverted fibers to said inlet.

3. The combination with a roller gin for seed cotton having an inlet and a ginning roller and stationary and movable blades forming a ginning region, of means for improving the continuity of the lint mat drawn between said stationary blade and said roller comprising a plurality of pairs of feed rollers arranged successively between said inlet and said region, the rollers of each pair being spaced apart to provide a path therebetween and all of said paths forming a pathway from said inlet to said region, and means to cause rotation of the rollers of each pair oppositely so as to draw therebetween cotton supplied thereto, and to cause rotation of successive pairs of rollers at progressively reduced speeds so as to condense the cotton delivered to said region.

4. The combination described in claim 3 including an additional pair of feed rollers located immediately adjacent the surface of said ginning roller for depositing the delivered seed cotton on said roller upstream of said blades.

5. The combination described in claim 3 including an overflow roller positioned immediately upstream and at the side of the path between the first of said roller pairs and means to rotate said overflow roller so as to divert excess supply of cotton at the entrance to said last mentioned path.

6. The combination described in claim 5 in which said overflow roller has radial blades for catching and diverting said excess supply.

* * * * *